(12) United States Patent
Hjelmeland Almås et al.

(10) Patent No.: US 8,090,780 B2
(45) Date of Patent: Jan. 3, 2012

(54) DEVICE, TIME, AND LOCATION BASED NOTIFICATION CONTENT TRANSFER AND PRESENTMENT SYSTEM AND METHOD

(75) Inventors: Randi-Lise Hjelmeland Almås, Leikanger (NO); Yoshimitsu Funabashi, Malmö (SE); Rui Yamagami, Limhamn (SE)

(73) Assignee: Sony Ericsson Mobile Communications AB, Lund (SE)

( * ) Notice: Subject to any disclaimer, the term of this patent is extended or adjusted under 35 U.S.C. 154(b) by 602 days.

(21) Appl. No.: 11/755,859

(22) Filed: May 31, 2007

(65) Prior Publication Data

US 2008/0301580 A1 Dec. 4, 2008

(51) Int. Cl.
*G06F 15/16* (2006.01)
*H04M 11/04* (2006.01)

(52) U.S. Cl. ..................... 709/206; 455/404.2

(58) Field of Classification Search ............... 455/404.2, 455/412.2; 709/204–207
See application file for complete search history.

(56) References Cited

U.S. PATENT DOCUMENTS 7,266,395 B2 * 9/2007 Schnurr .................. 455/567
7,541,940 B2 * 6/2009 Upton .................. 340/686.1
2004/0087300 A1 * 5/2004 Lewis .................. 455/412.2
2006/0264245 A1 * 11/2006 Luo .................. 455/567
2007/0105533 A1 * 5/2007 Chiu et al. .................. 455/412.2

OTHER PUBLICATIONS

International Search Report and Written Opinion for corresponding Application No. PCT/IB2007/003719 dated May 27, 2008.
International Preliminary Report on Patentability for corresponding Application No. PCT/IB2007/003719 dated Sep. 21, 2009.

* cited by examiner

*Primary Examiner* — Chirag Patel
(74) *Attorney, Agent, or Firm* — Renner, Otto, Boisselle & Sklar, LLP (57) ABSTRACT

A notification system, including a notification database and a notification application, receiving notification content from a sending device and provides the notification content for rendering on a target receiving device. The notification database may store, for each of a plurality of instances of notification content, the notification content in association with a target receiving device identifier and rendering instructions. The rendering instructions may comprise at least identification of a rendering time and a rendering location. The notification application i) receives, from the sending device, the notification content, the target receiving device identifier, and the rendering instructions; and writes such notification content, target receiving device identifier, and rendering instructions to the database.

9 Claims, 8 Drawing Sheets

Figure 1

| Notification ID 114 | Target Device ID 116 | Rendering Instructions 118 | | | Notification Content 120 | Delivery 121 |
| --- | --- | --- | --- | --- | --- | --- |
| | | Target Time 118a | Target Location 118b | | | |
| 1 | Mobile 1 | Unspecified | Grocery Store | | Get milk | — |
| 2 | Mobile 2 | Unspecified | Bill's Mobile BD-ADDR | | Tell Bill to … | Day/Time |
| 3 | Mobile 3 | Friday AM | Home Kitchen NFC Tag | | Take out garbage | — |
| 4a | Mobile 4 | Saturday | Cabin | | Open windows | Day/Time |
| 4b | Fixed A | Saturday | Cabin | | Open windows | — |

DEVICE, TIME, AND LOCATION BASED NOTIFICATION CONTENT TRANSFER AND PRESENTMENT SYSTEM AND METHOD

TECHNICAL FIELD OF THE INVENTION

The present invention relates to automated systems for transferring notification content from a first device to a second device for presentment on the second device and, in particular, for presentment on the second device based on permutations of time and location.

DESCRIPTION OF THE RELATED ART

Computerized calendar applications have existed for many years. For example, Outlook®, a product of Microsoft Corporation, combines a computerized calendar application with an email client application.

Utilizing the calendar application executing on a computer, a user may schedule an appointment. Thereafter, so long as the computer is active (e.g. not hibernating or powered off) and so long as the application is running at an applicable time prior to the appointment, the application will generate a pop-up window on the computer user interface display to render a reminder of the upcoming appointment. Typically the pop-up window will be rendered 15 minutes prior to the appointment—but that time is configurable.

The calendar application also allows the user to "invite" others to a scheduled appointment (in which case it is typically referred to as a meeting). In more detail, the application prompts the user to enter the email addresses of invitees and, after all email addresses have been entered, upon user activation of a "send" control, the calendar application interacts with the email client application to generate an invite email message to each invitee. The content of the email message includes the scheduled time and other information which the user chooses to provide.

Upon receipt of an invite email by the email application operating on the invitee's computer, which also may be Outlook®, the invitee is provided with controls for either accepting or declining the invite. In the event that the invitee accepts the invite, the appointment is automatically added to the invitees calendar. And, so long as the application is running at an applicable time prior to the appointment, the application will generate a pop-up window on the invitee's computer user interface display to render a reminder of the upcoming appointment.

More recently, portable devices such as mobile telephones, personal digital assistants (PDA's), and other devices which operate within a wide area wireless network have been equipped with similarly functioning calendar applications. Appointments may be scheduled on such portable devices by either synchronizing with the user's computer based email/calendar application or by direct scheduling by sending the invite email message directly to an email address associated with the portable device.

Similar to the computer based email/calendar application, so long as the device is powered on and the application is running in the background, the application will render a reminder of the upcoming appointment on the mobile device's user interface screen at an applicable time prior to the appointment time. The combination of this functionality in a portable device enables a person to receive appointment reminders even if he or she is not at his or her desk/office/computer at the applicable appointment reminder time.

A challenge with each existing computerized calendar application technology (whether implemented on a computer or a mobile device) is that its reminder function is time based. In more detail, initial notification of the appointment is rendered when the invite email is received and selected for reading by the user. The reminder will be rendered based on the scheduled time of the appointment. The sender of an email message (such as an invite email) can to some extent rely on contemporary technology to alert the user of the arrival of a new email, but the sender can not control when or where the user first reads the email. The same limits apply to text messaging. Further, once the recipient reads the email and accepts an appointment to add the appointment to the calendar, the rendering of the reminder will occur at a predetermined time regardless of the recipient's location.

What is needed is an automated system for transferring notification messages, appointment reminders, and other content from a first device to a second device for presentment on the second device based on permutations of time and location. Further, what is needed is for such a system to allow appointment reminders to be presented on the second device based on permutations of time and location without the recipient having to utilize user interface controls to add an appointment reminder (received in an email message) to a calendar application.

SUMMARY

A first aspect of the present invention comprises a notification system for receiving notification content from a sending device and providing the notification content for rendering on a target receiving device. The notification system may comprise a notification database and a notification application.

The notification database may store, for each of a plurality of instances of notification content, the notification content in association with a target receiving device identifier and rendering instructions. The rendering instructions may comprise at least identification of a rendering time and a rendering location.

The notification application i) receives, from the sending device, the notification content, the target receiving device identifier, and the rendering instructions; and ii) writes such notification content, target receiving device identifier, and rendering instructions to the database.

The notification application further provides the notification content and rendering instructions to the target receiving device associated with the target receiving device identifier such that the target receiving device may render, on its user interface, the rendering content when the target receiving device is at the rendering location and/or at the rendering time.

In one sub embodiment, the identification of the rendering location may comprise identification of at least one of: i) GPS coordinates; and ii) a location associated with predetermined GPS coordinates in a mapping database. As such, the rendering location may be determined by the target receiving device referencing a GPS receiver system.

In a second sub embodiment, the identification of a rendering location comprises identification of a unique identifier of a point to point wireless communication module associated with a third device—with which the target receiving device is capable of communication only when it is within a limited distance from the third device. As such, the target receiving device may identify that it is within a limited distance from the third device upon detecting the unique identifier of the point to point wireless communication module of the third device.

The third device may be a mobile device such that the target receiving device renders the notification content: i) when it is within a limited distance from the mobile device; and ii) independent of the geographic area wherein the target receiving device and the mobile device are co-located. In one example, the point to point wireless communication may be Bluetooth® and the unique identifier the unique Bluetooth address (BD_ADDR) assigned to the Bluetooth module of the third device.

Alternatively, the third device may be a static device associated with a predetermined geographic location such that the target receiving device renders the notification content when it is within a limited distanced from the static device. The static device may be a Wi-Fi network controller and the rendering instructions include identification of the SSID of the Wi-Fi network controller. As such, the target receiving device identifies the Wi-Fi network controller as the static device by its SSID.

A second aspect of the present invention comprises a notification device for rendering, on its user interface, rendering content in accordance with rendering instructions. The notification device comprises: i) a unique device identifier; ii) a user interface; and iii) a notification application.

The notification application obtains, from a notification database: i) notification content associated with a device ID matching the unique device identifier; and ii) rendering instructions associated with the notification content. The rendering instructions may comprise at least identification of a rendering time and a rendering location.

The notification application further drives the user interface of the device to render the notification content when the notification application determines that the location of the device corresponds to the rendering location and, if applicable, chronological time, by reference to an internal clock, corresponds to the rendering time.

In one sub embodiment, the device further comprises a GPS receiver system and identification of the rendering location may comprise identification of at least one of: i) GPS coordinates; and ii) a location associated with predetermined GPS coordinates in a mapping database. As such, the notification application may determine that the device is at the rendering location by referencing the GPS receiver system.

In a second sub embodiment, the identification of the rendering location may comprise a unique identifier associated with a short range point to point wireless communication module of a third device. In this second sub embodiment, the notification device may further comprise a compatible short range point to point wireless communication module capable of communication with the third device when it is within a limited distance from the third device.

The notification application drives the user interface of the device to render the notification content when the device communicates with the third device via short range point to point wireless communications and identifies the unique identifier associated with the short point to point wireless communication module of a third device.

Again, the third device may be a mobile device such that the target receiving device renders the notification content: i) when it is within a limited distance from the mobile device; and ii) independent of the geographic area wherein the target receiving device and the mobile device are co-located. In one example, the point to point wireless communication may be Bluetooth® and the unique identifier the unique Bluetooth address (BD_ADDR) assigned to the Bluetooth module of the third device.

Alternatively, the third device may be a static device associated with a predetermined geographic location such that the target receiving device renders the notification content when it is within a limited distanced from the static device. The static device may be a Wi-Fi network controller and the rendering instructions may include identification of the SSID of the Wi-Fi network controller. As such, the target receiving device identifies the Wi-Fi network controller as the static device by its SSID.

A third aspect of the present invention comprises a method of transferring notification content from a sending device to a target receiving device for rendering on the target receiving device.

The method comprises transferring, from the sending device to a notification server, the notification content, identification of the target receiving device, and rendering instruction. The rendering instructions may comprise at least identification of a rendering time and a rendering location.

The method further comprises: i) transferring, from the notification server to the target receiving device, the notification content and rendering instructions; and ii) driving a user interface of the target receiving device to render the notification content when a notification application of the target receiving device determines that the location of the target receiving device corresponds to the rendering location and, if applicable, chronological time, determined by reference to an internal clock, corresponds to the rendering time.

In one sub embodiment, the identification of the rendering location comprises identification of at least one of: i) GPS coordinates; and ii) a location associated with predetermined GPS coordinates in a mapping database. As such, driving the user interface of the target receiving device to render the notification content when a notification application of the target receiving device determines that the location of the target receiving device corresponds to the rendering location comprises calculating a GPS location of the target receiving device and driving the user interface to render the notification content when the GPS location of the target receiving device corresponds to the rendering location.

In a second sub embodiment, the identification of the target rendering location comprises a unique identifier associated with a short range point to point wireless communication module of a third device.

As such, driving the user interface of the target receiving device to render the notification content when a notification application of the target receiving device determines that the location of the target receiving device corresponds to the rendering location comprises determining that the device is within a limited distance in which the device is capable of communication with the third device by identifying the unique identifier associated with the short range point to point wireless communication module of the third device.

Again, the third device may be a mobile device such that the target receiving device renders the notification content: i) when it is within a limited distance from the mobile device; and ii) independent of the geographic area wherein the target receiving device and the mobile device are co-located.

Alternatively, the third device may be a static device associated with a predetermined geographic location such that the target receiving device renders the notification content when it is within a limited distanced from the static device.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

It should be emphasized that the term "comprises/comprising" when used in this specification is taken to specify the presence of stated features, integers, steps or components but does not preclude the presence or addition of one or more other features, integers, steps, components or groups thereof.

DETAILED DESCRIPTION OF EMBODIMENTS

The term "electronic equipment" as referred to herein includes portable radio communication equipment. The term "portable radio communication equipment", also referred to herein as a "mobile radio terminal" or "mobile device", includes all equipment such as mobile phones, pagers, communicators, e.g., electronic organizers, personal digital assistants (PDAs), smart phones or the like.

Many of the elements discussed in this specification, whether referred to as a "system" a "module" a "circuit" or similar, may be implemented in hardware circuit(s), a processor executing software code, or a combination of a hardware circuit and a processor executing code. As such, the term circuit as used throughout this specification is intended to encompass a hardware circuit (whether discrete elements or an integrated circuit block), a processor executing code, or a combination of a hardware circuit and a processor executing code, or other combinations of the above known to those skilled in the art.

In the drawings, each element with a reference number is similar to other elements with the same reference number independent of any letter designation following the reference number. In the text, a reference number with a specific letter designation following the reference number refers to the specific element with the number and letter designation and a reference number without a specific letter designation refers to all elements with the same reference number independent of any letter designation following the reference number in the drawings.

Figure 1:
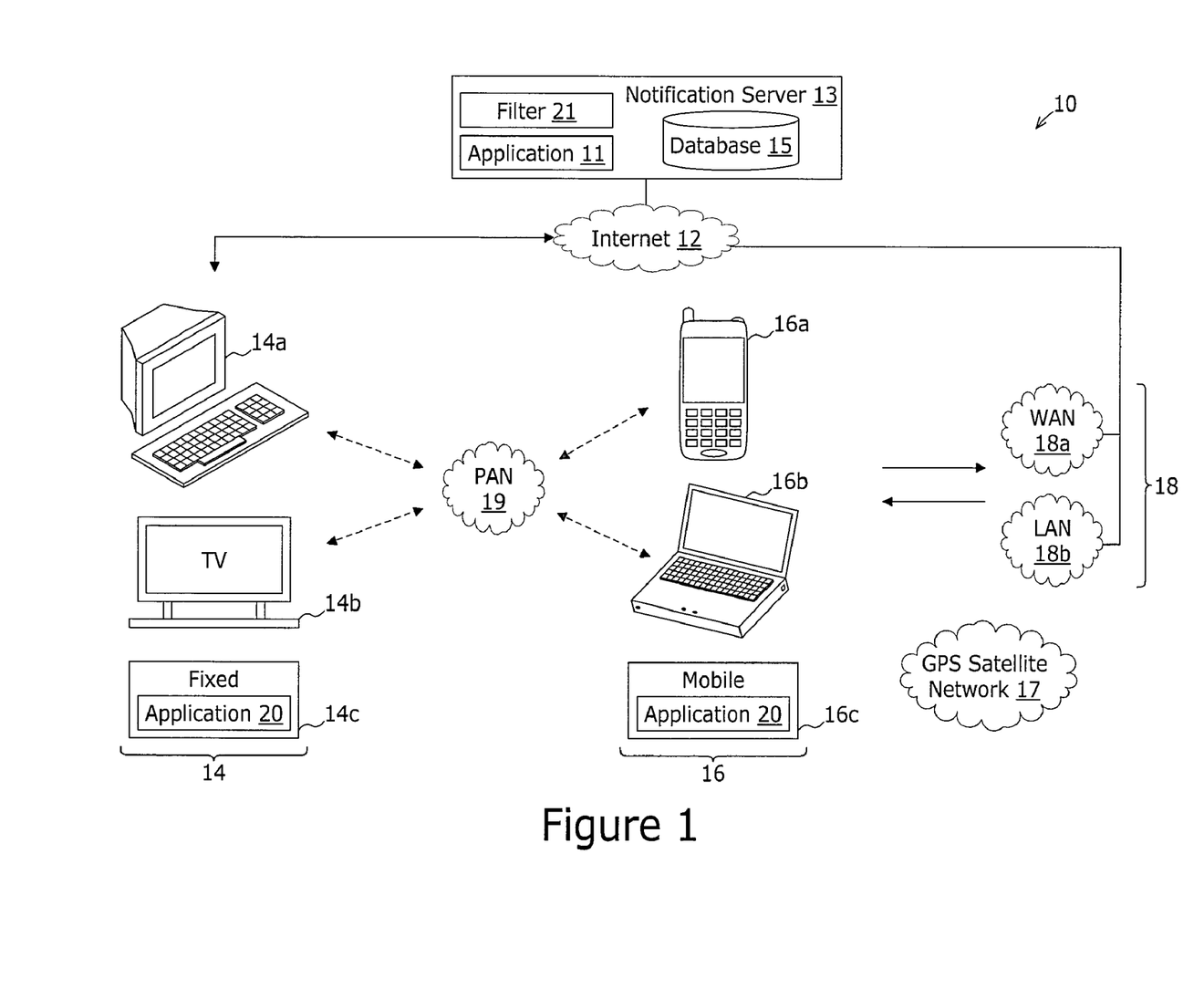
FIG. 1 is a diagram representing an exemplary architecture of a device, time, and location based notification content transfer system in accordance with one embodiment of the present invention.

With reference to FIG. 1, an exemplary architecture for a device, time, and location based notification and content transfer and presentment system 10 is shown. The exemplary system 10 comprises notification and content transfer server 13 coupled to the internet 12 and accessible by each of a plurality of fixed client devices 14 and mobile client devices 16 each of which operates a notification and content transfer client 20 (discussed herein).

The fixed client devices 14 comprise various fixed devices such as desk top computer 14a, a combination of a television/set top box 14b, and other computerized systems which generally are not frequently moved and can presumed to be at a fixed location.

The mobile client devices 16 comprise various mobile (and semi mobile devices) such a mobile telephone and/or personal digital assistant (PDA) 16a, a notebook computers 16b, and other mobile computerized systems 16c which obtain network access through wireless systems, are frequently moved, and/or are otherwise a type of device wherein it is frequently moved and its location can not be presumed to be fixed.

With respect to mobile client devices 16, the system 10 provides for determining a location of the mobile device for use of a combination of: i) wide area networks 18a such mobile telephone service provider networks with capabilities of determining a mobile client's location based on triangulation between base stations (e.g. towers); ii) local area wireless networks 18b which service a fixed location and enable a mobile client to determine its own location by identifying the network's SSID; and iii) a GPS satellite infrastructure 17 which enables a mobile client 16 to determine its own location based on GPS calculations from the satellite signals.

Further, the architecture provides for determining a location of a mobile client device 16 with respect to another device (e.g. proximity), whether such other device is a fixed device or a mobile device, utilizing a personal area network (PAN) 19. Exemplary PANs include networks utilizing technology such Bluetooth®, near field communication (NFC), infra-red (IrDA), or other point to point communication protocols which enable the mobile client device 16 to determine its own location with respect to the other device (e.g. proximity) based on a unique identifier associated with the communication technology for example Bluetooth® BD_ADDR.

In operation, the notification and content transfer client application 20 operating on each client device 14 and 16 communicates with the notification and content transfer server 13 to enable a user of one device 14 or 16 (e.g. a sending device) to: i) enter or select notification content for transfer, ii) select a recipient, iii) select a recipient device(s), whether mobile or fixed, iv) select rendering instructions which may include a combination of time and location (location may be a predetermined location or proximity to another device); and v) transfer the notification or content to such selected recipient device for rendering thereon in accordance with the rendering instructions.

As a first example, a user of one device (the sending device) may: i) enter a notification such as "Get Milk At The Grocery Store"; ii) identify a recipient such as the user's spouse; iii) identify the spouse mobile telephone or PDA as the recipient device; iv) identify the grocery store as a location based rendering parameter; v) identify an unspecified time as a time based rendering parameter; and vi) initiate transfer to the notification server 13.

The notification server 13 provides for transferring the notification content and rendering instructions to the identified recipient device. The recipient device then, when it determines that it is in the location identified by the location based rendering parameter (e.g. recipient is in the grocery store) renders the notification as an alert. This enables the notification to be rendered at a location where the recipient is capable of immediately acting on the notification as opposed to being required to remember the content of the notification for later action.

It should be appreciated that in this first example, the recipient device may determine its location based on any of identification of GPS coordinates associated with the grocery store, identification of the SSID of the grocer's LAN, identification of the grocer's NFC infrastructure, or other similar means.

As a second example, a user of one device (the sending device) may: i) enter a notification such as "Tell Bill To Do . . . <<Exemplary Action>>>"; ii) identify a recipient such as the user's spouse; iii) identify the spouse mobile telephone or PDA as the recipient device; iv) identify a unique PAN identifier associated with Bill (such as BD_ADDR of Bill's mobile telephone) as a location based rendering parameter; v) identify an unspecified time (or a specified time period) as a time based rendering parameter; and vi) initiate transfer of this content to the server 13.

The server 13 provides for transferring the notification and rendering instructions to the recipient device. The recipient device then, when it determines that it is in proximity to Bill based on recognizing the PAN ID, renders the notification as an alert. This enables the notification to be rendered when the recipient is in physical proximity to Bill and the recipient is capable of immediately acting on the notification as opposed to being required to remember the content of the notification for later action.

As a third example, a user of one device may: i) enter a notification such as reminder to "Take Out Garbage"; ii) identify himself or herself as the receipt; iii) identify his or her mobile telephone as the recipient device; iv) identify the person's kitchen as a location based rendering parameter; and v) identify an unspecified time (or a specified time period such as the time period just prior to trash collection) as a time based rendering parameter. The notification may be transferred to the server 13 or, if entered on the same device as the recipient device, the notification may remain local only.

The recipient device then, when it determines that it is in the kitchen for example by recognizing an NFC tag identifier associated with the kitchen, renders the reminder. Again, this enables the notification to be rendered when the recipient is capable of immediately acting on the notification as opposed to being required to remember the content of the notification for later action.

As yet a fourth example, a user of one device (the sending device) may: i) enter a notification such as "Open Windows at the Cabin"; ii) identify a recipient such as the user's spouse; iii) identify the spouse mobile telephone or PDA as the recipient device as well as a fixed device at the Cabin such as an internet compatible television/set top box combination; iv) with respect to the mobile device, identify the Cabin at its location based rendering parameter; v) identify an unspecified time as a time based rendering parameter; and vi) initiate transfer to the notification server 13.

The notification server 13 provides for transferring the notification and rendering instructions to both identified recipient devices. The fixed location recipient device renders the notification in accordance with the time parameters (if any). The mobile device renders the notification when it determines that it is in the location identified by the location based rendering parameter (e.g. recipient at the cabin). Again, this enables the notification to be rendered at a location where the recipient is capable of immediately acting on the notification as opposed to being required to remember the content of the notification for later action.

It should be appreciated that in this fourth example, the recipient mobile device may determine its location based on any of identification of GPS coordinates associated with the cabin, identification of the SSID of the cabin's LAN, or identification of being within communication range of the Television/Set top box by identification of its PAN ID.

Notification Server

As discussed in each example, the notification server 13 provides the function of: i) receiving the notification content and rendering instructions from the sending device as well as identification of the recipient device(s); and ii) making the notification content and rendering instructions available to the recipient device(s) such that the notification content may be rendered thereon in accordance with the applicable time and/or location defined by such rendering instructions. To provide these functions, the notification server 13 may comprises a server application 11, a database 15, and optionally, an authorization/spam filter 21.

Figure 2:
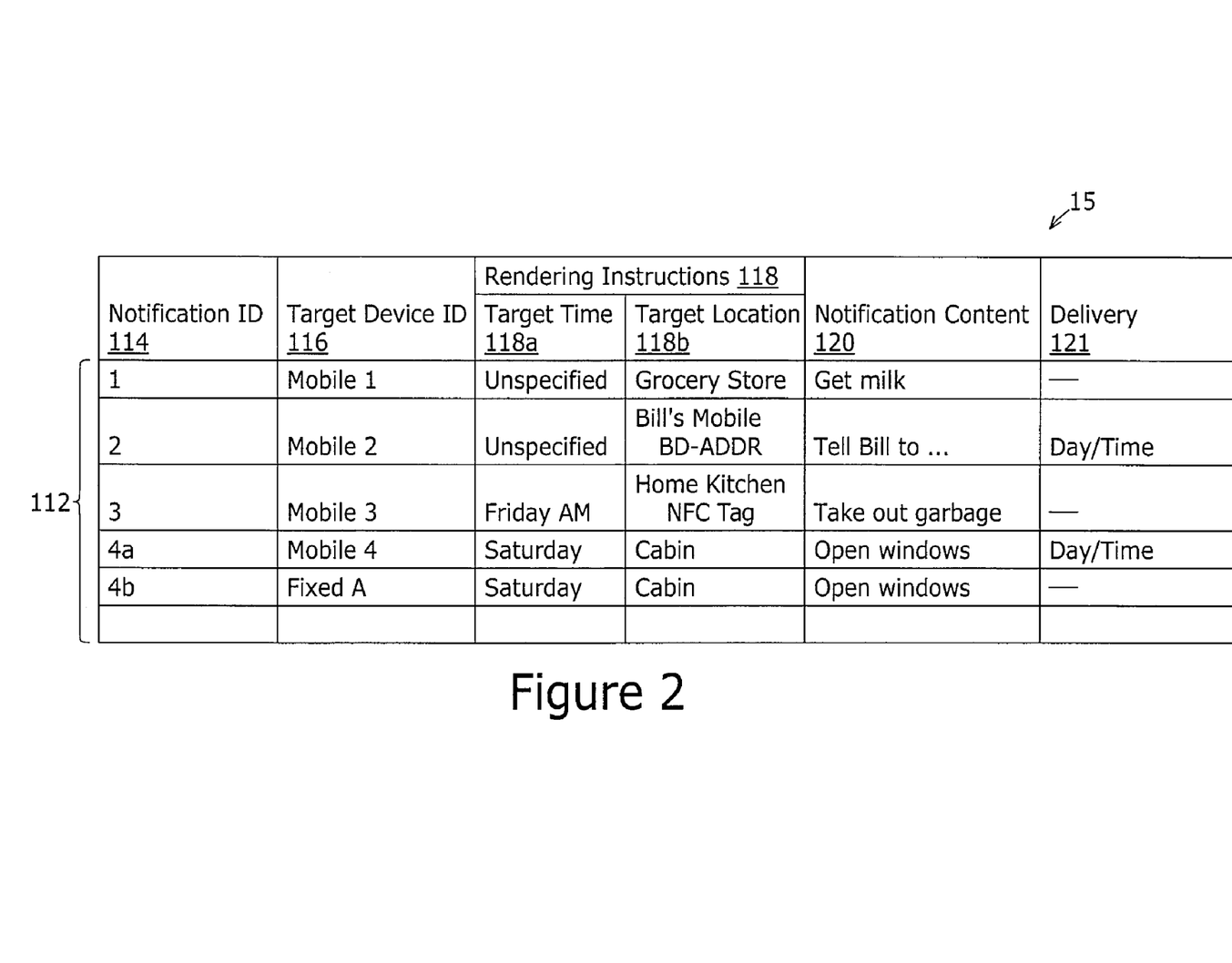
FIG. 2 is an exemplary notification database in accordance with one embodiment of the present invention.

Turning briefly to FIG. 2, the database 15 may comprise a plurality of records 112. Each record represents a notification that has been received by a sending device. Each notification is identified by a unique notification identifier stored in notification ID field. The notification further includes: i) identification of the recipient device(s) selected by the sending device—stored in target device ID field 116; ii) rendering instructions including both a rendering time and rendering location selected by the sending device stored in a rendering time field 118a and a rendering location field 118b respectively; iii) the notification content provided by the sending device stored in a notification content field 120; and iv) a delivery time stamp field which indicates whether the notification has been provided to the recipient device and, if yes, at what time. In this exemplary database 15, a notification that is to be delivered to more than one sending device may be represented by multiple records 112 of the database 15. For example, the notification to "Open Windows at the Cabin", discussed above, may be directed to both the recipient's mobile device (record identified by 4a) and to a fixed device at the cabin (record identified by 4b).

To provide for both receiving notifications from sending device(s) and providing such notifications to the applicable receiving device, each client device 14, 16 may periodically log-on to the notification server 13 for purposes of sending notifications to other client devices and receiving notifications sent by other client devices.

Figure 3:
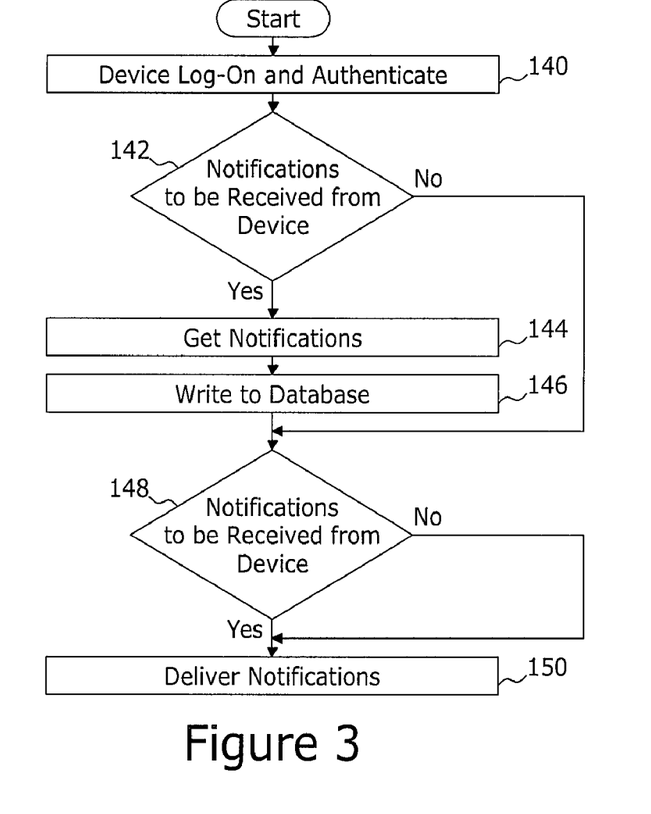
FIG. 3 is a flow chart representing exemplary operation of a notification server application in accordance with one embodiment of the present invention.

Referring to FIG. 3 in conjunction with FIG. 1, exemplary steps performed by the server application 11 in support of such a function may include step 240 which represents receiving a log-on connection from a client device 14, 16 and authenticating the client device 14, 16.

Step 142 represents determining whether the client device 14, 16 has notifications for upload to the server. If yes, the notifications are uploaded from the client device 14, 16 at step 144 and written to the database at step 146.

Step 148 represents determining whether there are open notifications to be delivered by the server to the client device 14, 16 (e.g. to be received by the client device). If yes, the notifications are delivered to the client device 14, 16 and the "time stamp" of the delivery field 121 of the database 15 (FIG. 2) is updated at step 150. If not, the session may be terminated.

It should be appreciated that multiple technologies exist for implementing these functions of the server application 11. Exemplary technologies include: i) TCP/IP—wherein the server application 11 is a "Web Server" and each client device 14, 16 may periodically establish a TCP/IP connection to the server application 11 for upload and download of notifications; ii) Web Services/SOAP messaging—wherein the server application 11 accepts and responds to SOAP messages for upload and download of notifications; and iii) Email services protocols such as POP and SMTP wherein upload and download of notifications is essentially handled as email.

Returning again to FIG. 1, the authorization/SPAM filter 21 may prevent marketers from advertisements masqueraded as notifications—particularly in bulk. In one aspect, the authorization/SPAM filter 21 may operate similar to a typical email Spam Filter in that it would quarantine messages matching certain characteristics (or sent by senders matching certain characteristics) that indicate that the notification is likely to be an advertisement intended for multiple receivers versus a notification sent to a particular identified receiver.

Figure 4:
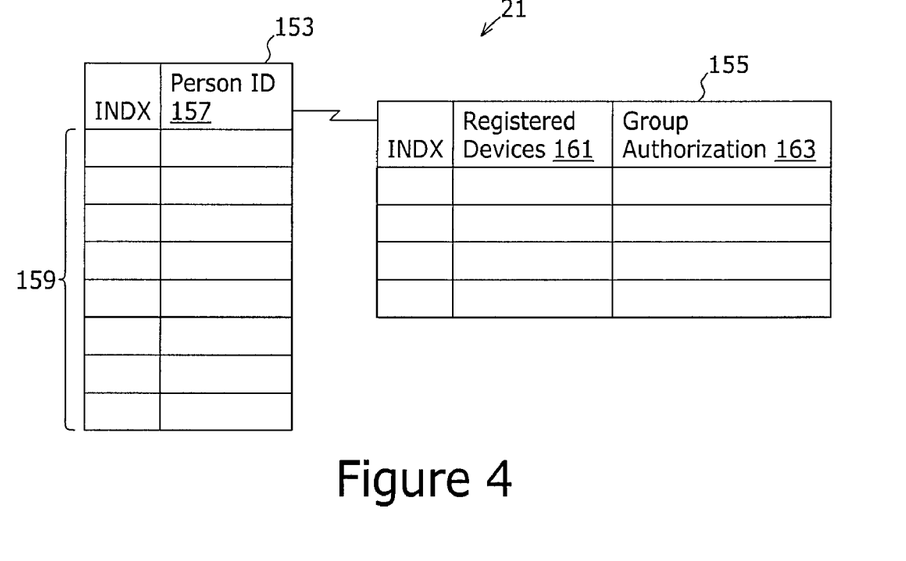
FIG. 4 is a table diagram representing exemplary structure of an authorization/SPAM module in accordance with one embodiment of the present invention.

In another aspect, and with brief reference to FIG. 4, the authorization/SPAM filter 21 may operate by allowing only authorized senders to send notifications to a particular receiving device. In more detail, the authorization/SPAM filter 21 may include a person ID table 153 with a plurality of records 159. Each record 159 identifies a person (in a person ID field 157) with devices capable of receiving notifications. Logically associated with each record 159 is a device table 155 which identifies (in a registered devices field 161) those devices associated with the person. Further, associated with each registered device is a group authorization field 163 which identifies authorized senders (e.g. those people or client devices authorized to send notifications to the registered device. The group authorization field 163 may identify senders by name, by device ID, or by a group or association identification.

In operation, the authorization/SPAM filter may compare each notification provided by a sending device to group authorization 163 for the identified receiving device and only transfer to the receiving device those notifications sent by an authorized sender.

Mobile Client Device

Figure 5:
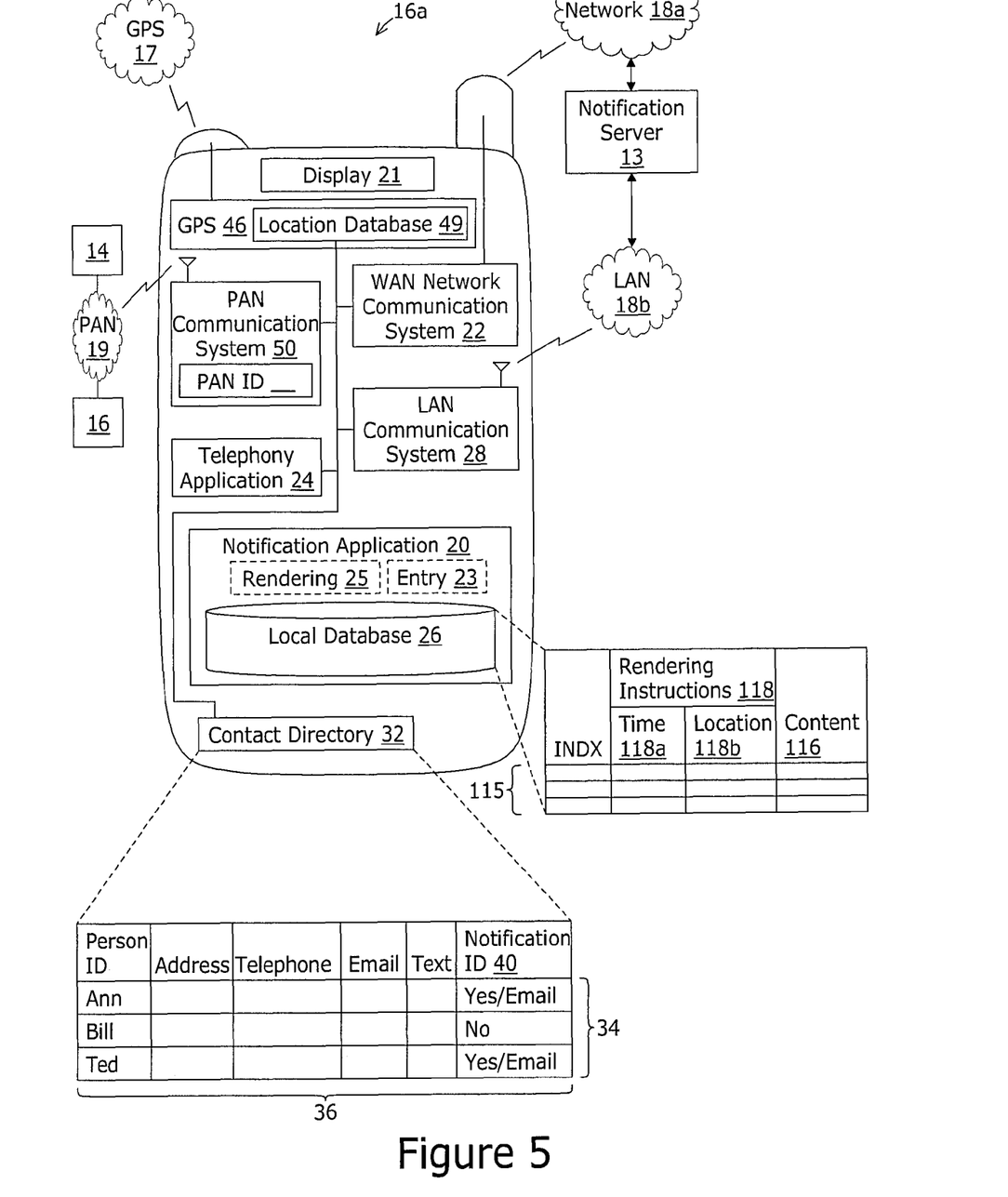
FIG. 5 is a diagram representing an exemplary notification device in accordance with one embodiment of the present invention.

The diagram of FIG. 5 represents an exemplary client device 14, 16 embodied as a mobile client device 16a such as a mobile telephone or mobile PDA. The mobile client device 16a comprises a telephony application 24 and a wide area network (WAN) communication system 22 for communication with other devices over a wide area network 18a with which the WAN communication system 22 is compatible. In the exemplary embodiment, the wide area network 18a may be any combination of a wireless telephone service provider network, an Internet service provider network, a wide area data network, and/or the public Internet.

The mobile client device 16 may also include a local area network (LAN) system 28 for communication with other devices over a local area network 18b with which the LAN communication system 28 is compatible. In the exemplary embodiment, the local area network 18b may be an 802.11 WiFi network or network of similar technology.

The mobile client device 16 may also include a point to point wireless communication system 50 which may be any of a Bluetooth® radio, Infra Red communication module, near field communication (NFC) module or other system for short range communication with another compatible device.

The local communication system 50 operates to discover and identify other devices (such as other mobile client devices 16 and other fixed client devices 14) within a communication zone or personal area network 18c around the mobile client device 16a. Such other devices may be identified by network name, network address, or other unique identifier—such as Bluetooth BD_ADDR or NFC ID Number.

The mobile client device 16 may include a GPS system 46 which detects signals from GPS satellites (17 of FIG. 1) and calculates the location (typically longitude, latitude, and elevation) of the mobile device 16. Further, a location database 49 may be used to associate such longitude, latitude, and elevation coordinates with identification of the location in terms of country, state, city, street, street address, or other human recognizable text based data useful for referencing the location such as user's home, user's cabin, Brand X grocery store, user's office, etc.

The mobile client device 16 may further yet include a contact directory 32 which includes a plurality of contact records 34. Each contact record 34 may include traditional contact information fields 36 such as the person's name, address, telephone number, email address, text message address, and etc. The contract directory 32 serves its traditional purpose of providing a network address (e.g. telephone number, email address, text address) associated with the person identified in the contact record 34 to enable any of the telephony application 24, an email application (not shown), or a text messaging application (not shown) to initiate a communication (message or session) to the network address via the network communication system 22. Further, the contact directory 32 may associate, with each contact, a recipient device ID (stored in a notification ID field 40. The recipient device ID may be used to by the notification and content transfer application 20 for identifying a recipient device when sending a notification to the notification server 13.

As discussed, the notification and content transfer application 20 may: i) facilitate entry of notifications and/or other content for transfer to a target receiving device; ii) communicate with the notification server 13 to upload such notification to the notification server 13; iii) receive notifications (initiated by remote sending devices) for rendering in accordance with applicable rendering instructions inclusive of both time based rendering instructions and location based rendering instructions; and iv) render such received notifications in accordance with the time and location based rendering instructions. Such communication with the notification server 13 may utilize the WAN communication system 22 and network 18a and/or the LAN communication system 28 and the local area network 18b.

The notification and content transfer application 20 may comprise an entry module 23, a rendering module 25, and a local database 26 for storing notifications (initiated by remote sending devices) received from the notification server 13 for rendering on the mobile client device 16a. The notifications are rendered when the rendering module 25 determines that the mobile client device 16a is at an applicable location and/or the time, as determined by reference to an internal clock (not shown), is within an applicable rendering period.

Figure 6:
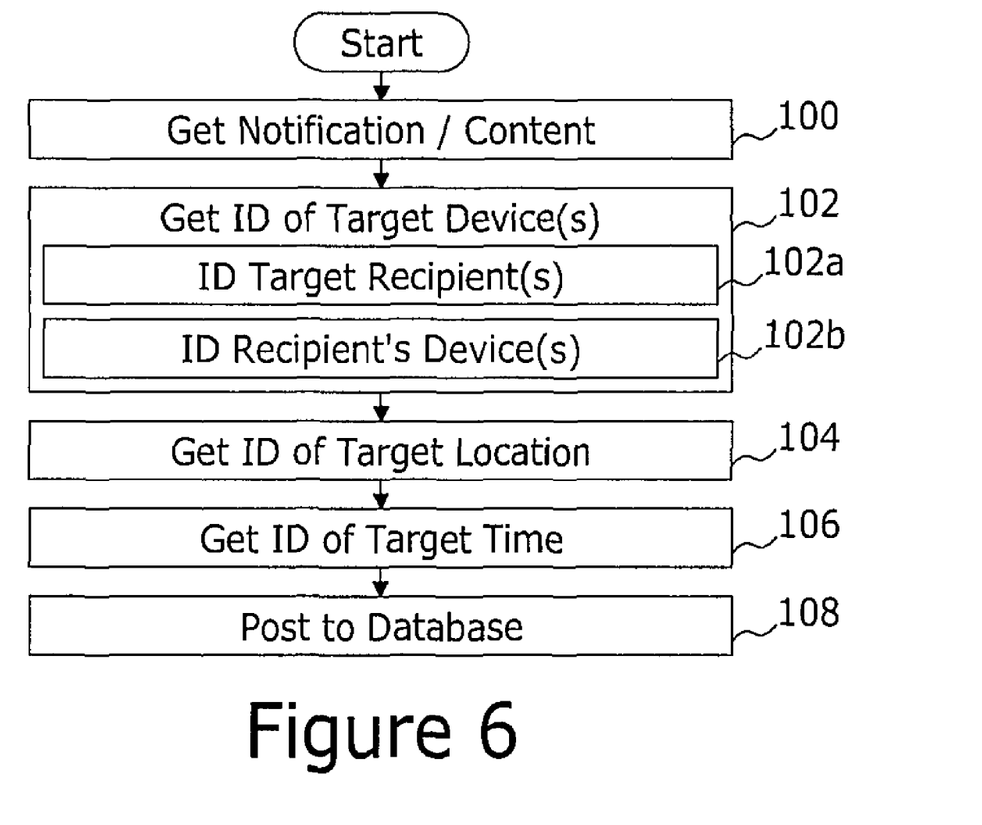
FIG. 6 is a flow chart representing exemplary operation of on aspect of a notification application in accordance with one embodiment of the presentment invention.
Figure 7:
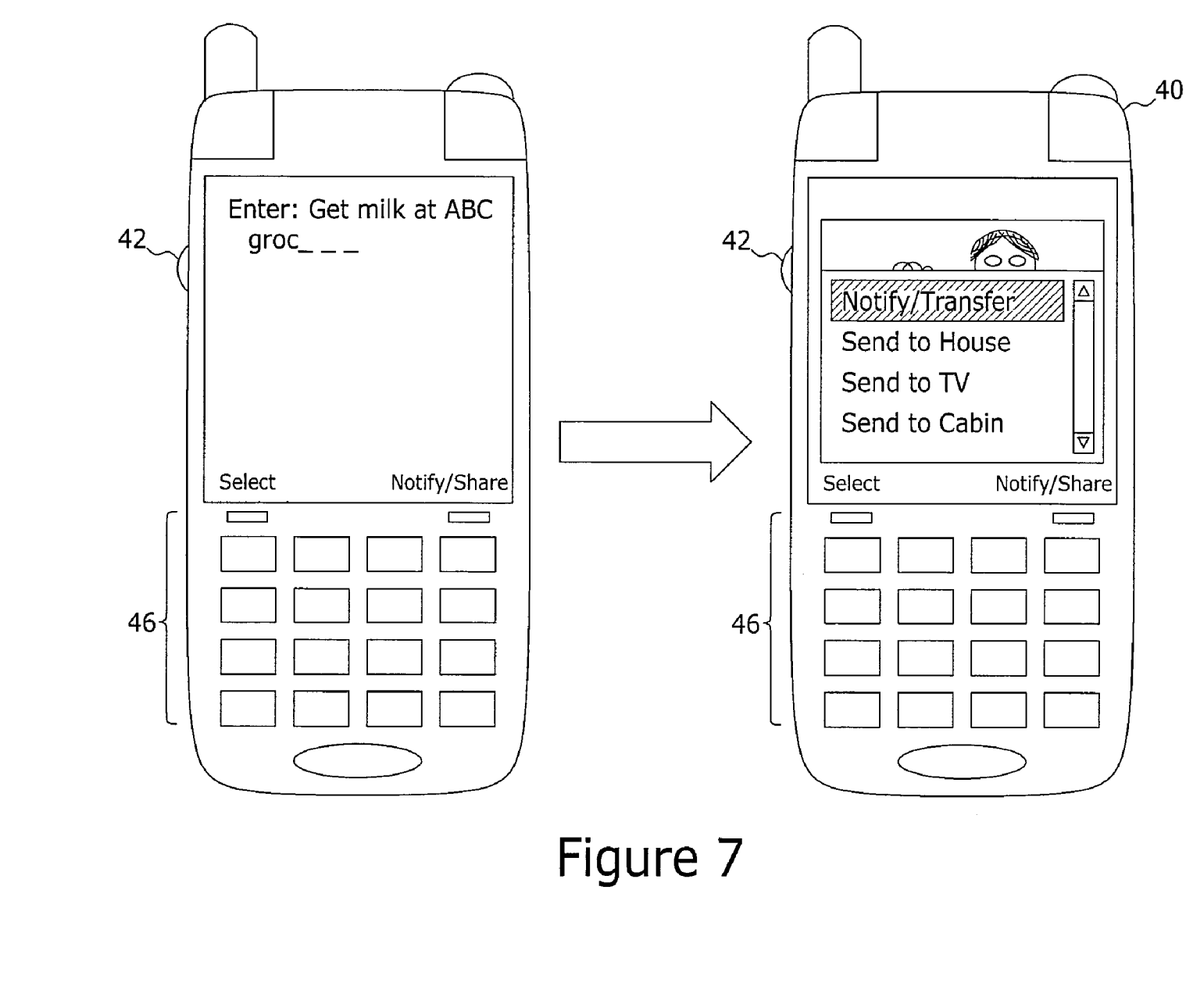
FIG. 7 is a diagram representing an exemplary notification device in accordance with one embodiment of the present invention.
Figure 8:
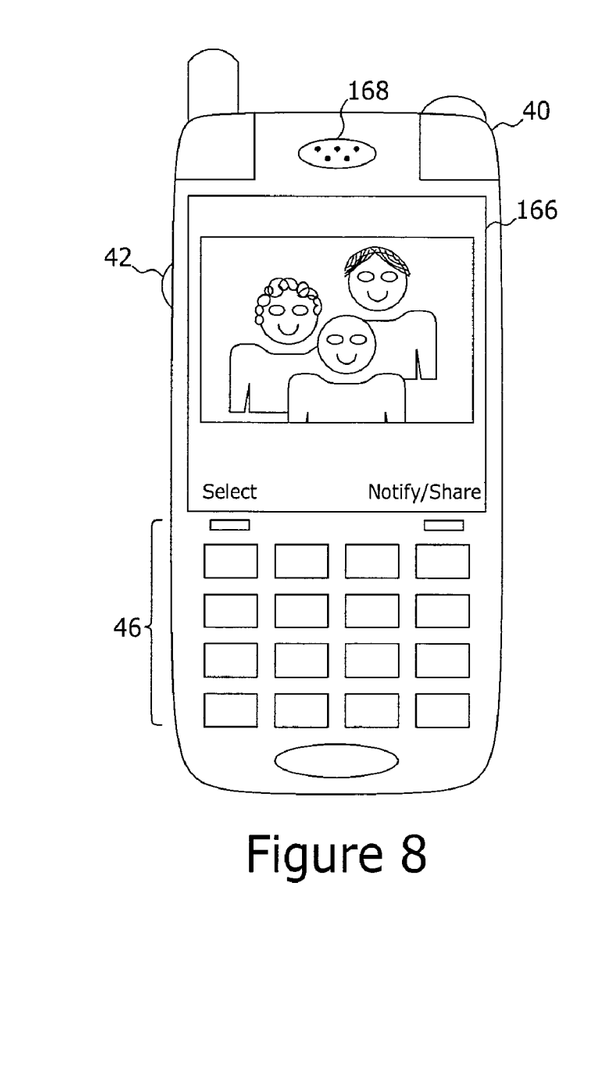
FIG. 8 is a diagram representing an exemplary notification device in accordance with one embodiment of the present invention.

The flow chart of FIG. 6 represents exemplary operation of the entry module 23. Turning briefly to FIG. 6 in conjunction with FIG. 7, step 100 represents obtaining user entry of the notification content. In more detail, step 100 may represent detecting user activation of a button 42 (or other hardware or software user interface control of the device) to initiate sending of a notification and, in response thereto, prompting the user to enter a notification and/or other content by text entry using keypad 46, selection of preprogrammed text or graphic based notifications, and/or selection of content embodied as a file—such as a photograph. For example and briefly referring to FIG. 8, if the button 42 is activated while a photograph is being viewed on the display screen 166, the photograph file may automatically be incorporated into the notification as its content.

Returning to FIG. 6, step 102 represent obtaining user identification of the target receiving device. Such step may comprise identifying the target recipient (sub step 102a) and identifying the recipient's device (sub step 102b). Such step may utilize the user interface (e.g. key pad 46) of the device for identifying the recipient and recipient device by manual date entry or by selection of commonly selected recipients and/or recipient devices from the contact directory 32 (FIG. 5).

Steps 104 and 106 represent obtaining user selection of rendering instructions including a rendering location for rendering and/or a rendering time for rendering respectively. Step 108 represents logging-in to the notification server 13 and posting the notification and/or content to the notification server 13 for transfer to the target receiving device—as discussed with respect to FIG. 3.

Figure 9:
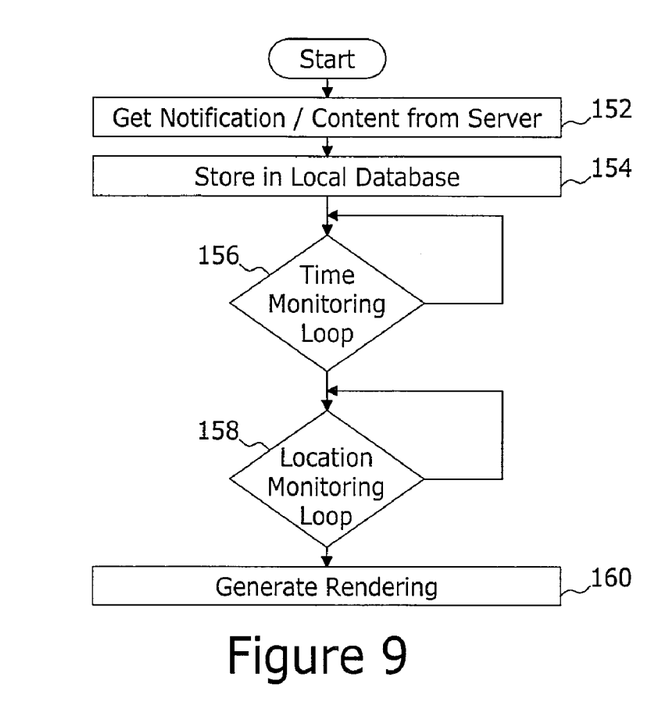
FIG. 9 is a flow chart representing exemplary operation of on aspect of a notification application in accordance with one embodiment of the presentment invention.

The flow chart of FIG. 9 represents exemplary operation of the rendering module 25. Referring to FIG. 9 in conjunction with FIG. 5, step 152 represents obtaining a notification from the server 13 during one of the client's periodic log-ins to the server 13 as discussed with respect to FIG. 3.

Step 154 represents storing the notification in the local database 26. The local database 26 may comprise a plurality of records 115, each for storing a notification. Each record associates the notification content 116 with rendering instructions including a rendering time (stored in a time filed 118a) and a rendering location (stored in a location field 118b).

Steps 156 and 158 represents a time monitoring loop and a location monitoring loop for determining when chronological time, obtained by monitoring an internal clock (not shown), is within the rendering time and when the location of the device is at the rendering location. When the rendering time and/or rendering location are achieved, the notification content is rendered on the device as represented by step 160.

Figure 10:
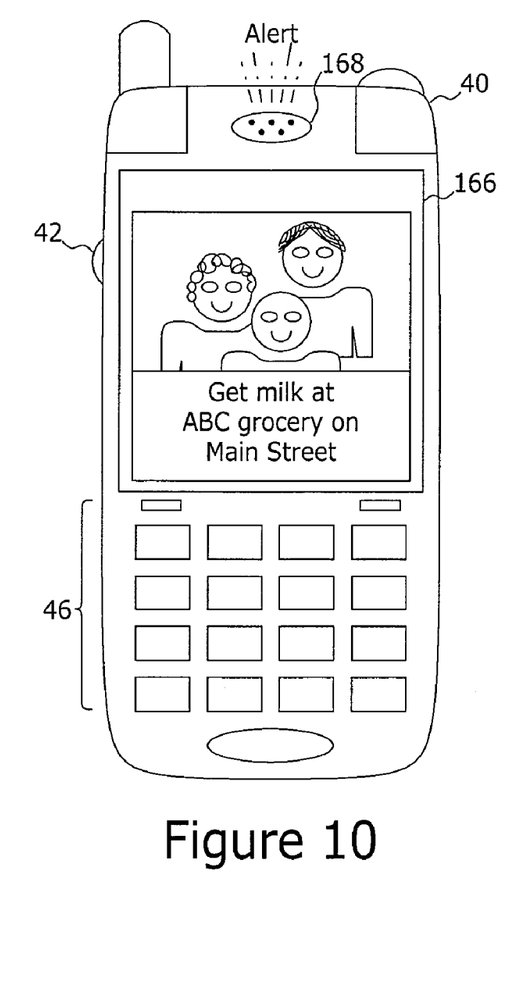
FIG. 10 is a diagram representing an exemplary notification device displaying a notification in accordance with one embodiment of the present invention.

Turning briefly to FIG. 10, the rendered notification content may be by way of a pop-up alert 164 on a display screen 166 and/or an audible alert generated by a speaker 168.

Although the invention has been shown and described with respect to certain preferred embodiments, it is obvious that equivalents and modifications will occur to others skilled in the art upon the reading and understanding of the specification. As one example, the diagram of FIG. 5 represents an exemplary client embodied as a mobile device. Those skilled in the art will recognize that similar structure may be utilized for implementing other clients, both fixed, and mobile and that actual client structure is a matter of design choice. As another example, the authorization/SPAM filter is represented as a component of the notification server. Those skilled in the art will recognize that similar structure may be implemented on the receiving client without departing from the spirit of the present invention. The present invention includes all such equivalents and modifications, and is limited only by the scope of the following claims.

The invention claimed is:

1. A notification system for receiving notification content from a sending device and providing the notification content for rendering on a target receiving device, the notification system comprising: an interface to a network; a processor arranged to:

receive data from the sending device and over the interface to the network, the data including:
a target receiving device identifier;
notification content associated with the target receiving device identifier; and
rendering instructions associated with the notification content;
store the received data in a notification database, the notification database including, for each of a plurality of instances of notification content, the notification content in association with the target receiving device identifier and rendering instructions, the rendering instructions comprising at least identification of a rending location, the identification of a rendering location comprising identification of a unique identifier of a point to point wireless communication module associated with a third device with which the target receiving device is capable of communication when it is within a limited distance from the mobile device, the third device being a mobile device, whereby the target receiving device identifies that it is within a limited distance from the mobile device upon detecting the unique identifier of the point to point wireless communication module of the mobile device, the rendering location being a predetermined physical or geographical location that is independent of the physical or geographical location of the sending device; and
provide to a target receiving device, for each instance of notification content that is associated with the target receiving device identifier that corresponds to a target receiving device, the notification content and the rendering instructions, the target receiving device rendering the notification content: i) when the target receiving device is within a limited distance from the mobile device; and ii) independent of a geographic area wherein the target receiving device and the mobile device are co-located.

2. The notification system of claim 1, wherein the rendering instructions further include a rendering time.

3. The notification system of claim 2, wherein the identification of the rendering location comprises identification of at least one of:
GPS coordinates; and
a location associated with predetermined GPS coordinates in a mapping database.

4. A notification device comprising:
a user interface; and
a processor arranged to:
receive notification content associated with a device identifier matching a unique device identifier of the notification device from a sending device; and
receive rendering instructions associated with the notification content, the rendering instructions comprising at least identification of a rendering location, the identification of the rendering location comprising a unique identifier associated with a short range point to point wireless communication module of a third device, the third device being a mobile device, the rending location being a predetermined physical or geographical location that is independent of the physical or geographical location of the sending device;
determined the rendering location associated with the notification content; and
drive the user interface to render the notification content when the processor determines that the physical location of the device corresponds to the rendering location;
the device further comprising a compatible short range point to point wireless communication module capable of communication with the mobile device when within a limited distance from the mobile device; and driving the user interface to render the notification content when the notification device communicates with the mobile device via short range point to point wireless communications and identifies the unique identifier associated with the short range point to point wireless communication module of the mobile device;

the notification device rendering the notification content: i) when the notification device is within a limited distance from the mobile device; and ii) independent of a geographic area wherein the notification device and the mobile device are co-located.

5. The notification device of claim 4, wherein:

the rendering instructions further include a rendering time; and driving the user interface to render the notification content occurs only when the processor determines that the physical location of the device corresponds to the rendering location and a chronological time corresponds to the rendering time.

6. The notification device of claim 4, wherein:

the identification of the rendering location comprises identification of at least one of:

GPS coordinates; and a location associated with predetermined GPS coordinates in a mapping database;

the device further comprises a GPS receiver; and driving the user interface to render the notification content occurs only when the processor determines, by reference to the GPS receiver, that the physical location of the device corresponds to the rendering location.

7. A method of transferring notification content from a sending device to a target receiving device for rendering on the target receiving device, the method comprising;

transferring, from the sending device to a notification server, the notification content, identification of the target receiving device, and rendering instruction from the sending device, the rendering instructions comprising at least identification of a target rendering location, the identification of the target rending location comprising a unique identifier associated with the short range point to point wireless communication module of a third device, the third device being a mobile device, the rending location being a predetermined physical or geographical location that is independent of the physical or geographical location of the sending device;

transferring, from the notification server to the target receiving device, the notification content and rendering instructions; and driving a user interface of the target receiving device to render the notification content when a processor of the target receiving device determines that the physical location of the target receiving device corresponds to the rendering location;

determining that the physical location of the target receiving device corresponds to the rendering location by determining that the target receiving device is within a limited distance, in which the target receiving device is capable of communication with the mobile device, by identifying the unique identifier associated with the short range point to point wireless communication module of a mobile device wherein the target receiving device renders the notification content: i) when the target receiving device is within the limited distance from the mobile device; and ii) independent of a geographic area wherein the target receiving device and the mobile device are co-located.

8. The method of claim 7, wherein:

the rendering instructions further include a rendering time; and driving the user interface of the target receiving device to render the notification content comprises driving the user interface of the target receiving device to render the notification content only when:

a processor determines that the physical location of the device corresponds to the rendering location; and a chronological time corresponds to the rendering time.

9. The method of claim 7, wherein:

the identification of the rendering location comprises identification of at least one of:

GPS coordinates; and a location associated with predetermined GPS coordinates in a mapping database; and driving a user interface of the target receiving device to render the notification content when a processor of the target receiving device determines that the physical location of the target receiving device corresponds to the rendering location comprises calculating a GPS location of the target receiving device and driving the user interface to render the notification content when the GPS location of the target receiving device corresponds to the rendering location.

* * * * *